US011312358B2

(12) United States Patent
Yui et al.

(10) Patent No.: US 11,312,358 B2
(45) Date of Patent: Apr. 26, 2022

(54) HYBRID VEHICLE

(71) Applicant: HONDA MOTOR CO., LTD., Tokyo (JP)

(72) Inventors: Naoki Yui, Saitama (JP); Tomohiro Shibata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 492 days.

(21) Appl. No.: 16/005,892

(22) Filed: Jun. 12, 2018

(65) Prior Publication Data
US 2018/0362015 A1 Dec. 20, 2018

(30) Foreign Application Priority Data

Jun. 16, 2017 (JP) .............................. JP2017-118802

(51) Int. Cl.
*B60W 20/12* (2016.01)
*B60W 20/14* (2016.01)
(Continued)

(52) U.S. Cl.
CPC .............. *B60W 20/12* (2016.01); *B60K 6/442* (2013.01); *B60W 10/06* (2013.01); *B60W 10/08* (2013.01);
(Continued)

(58) Field of Classification Search
CPC ...... B60W 20/12; B60W 20/14; B60W 10/08; B60W 10/26; B60W 30/20; B60W 40/076;
(Continued)

(56) References Cited

U.S. PATENT DOCUMENTS 8,437,936 B2 * 5/2013 Schwarz ............. B60W 10/188
701/70
9,758,153 B2 * 9/2017 Ogawa ................... B60K 6/445
(Continued)

FOREIGN PATENT DOCUMENTS

CN        101272942 A    9/2008
CN        101522495 A    9/2009
(Continued)

OTHER PUBLICATIONS

Jan. 29, 2019, Japanese Office Action issued for related JP Application No. 2017-118802.
(Continued)

*Primary Examiner* — Russell Frejd
*Assistant Examiner* — Matthias S Weisfeld
(74) *Attorney, Agent, or Firm* — Paratus Law Group, PLLC

(57) ABSTRACT

A hybrid vehicle includes: an internal combustion engine; a first rotating electric machine generating electricity by a power of the internal combustion engine; an electric capacitor; a second rotating electric machine connected to a drive wheel and driven by power supply from at least one of the electric capacitor and the first rotating electric machine; a geographical information acquisition unit acquiring geographical information; and a control unit controlling a charging operation for charging the electric capacitor with power generated during a regenerative operation of the second rotating electric machine or an electricity waste operation for consuming the power by the hybrid vehicle. The control unit starts the electricity waste operation when the remaining capacity of the electric capacitor becomes equal to or greater than a threshold value during the regenerative operation of the second rotating electric machine and (Continued)

sets the threshold value based on the geographical information.

11 Claims, 9 Drawing Sheets

(51) Int. Cl.
| | |
|---|---|
| *B60W 40/076* | (2012.01) |
| *B60W 10/26* | (2006.01) |
| *B60W 10/08* | (2006.01) |
| *B60W 50/00* | (2006.01) |
| *B60W 10/06* | (2006.01) |
| *B60W 30/18* | (2012.01) |
| *B60K 6/485* | (2007.10) |
| *B60W 30/20* | (2006.01) |
| *B60K 6/442* | (2007.10) |
| *B60K 6/48* | (2007.10) |

(52) U.S. Cl.
CPC ............ *B60W 10/26* (2013.01); *B60W 20/14* (2016.01); *B60W 30/18127* (2013.01); *B60W 30/20* (2013.01); *B60W 40/076* (2013.01); *B60W 50/0097* (2013.01); *B60K 6/485* (2013.01); *B60K 2006/4808* (2013.01); *B60W 2510/244* (2013.01); *B60W 2520/10* (2013.01); *B60W 2552/20* (2020.02); *B60W 2552/30* (2020.02); *B60W 2556/50* (2020.02)

(58) Field of Classification Search
CPC ......... B60W 50/0097; B60W 2556/50; B60W 2552/20; B60W 2552/30; B60W 2510/244; B60W 2520/10; B60W 2552/25; B60W 10/06; B60K 6/442; B60K 6/485; B60K 2006/4808
USPC .......................................................... 701/22
See application file for complete search history.

(56) References Cited

U.S. PATENT DOCUMENTS

| | | | |
|---|---|---|---|
| 9,969,271 | B2* | 5/2018 | Ogawa .................. B60W 10/08 |
| 10,246,075 | B2* | 4/2019 | Morisaki ............... B60W 20/13 |
| 10,246,076 | B2* | 4/2019 | Ogawa .................. B60W 10/26 |
| 2009/0277702 | A1 | 11/2009 | Kanada et al. |
| 2010/0006359 | A1 | 1/2010 | Ang et al. |
| 2015/0224981 | A1 | 8/2015 | Fujishiro et al. |
| 2017/0021730 | A1 | 1/2017 | Ogawa |
| 2017/0021821 | A1* | 1/2017 | Ogawa .................. B60W 10/06 |
| 2017/0096134 | A1 | 4/2017 | Yoon et al. |
| 2018/0273021 | A1* | 9/2018 | Morimoto ............... B60L 58/13 |

FOREIGN PATENT DOCUMENTS

| | | |
|---|---|---|
| JP | H04-322105 A | 11/1992 |
| JP | 2000-032606 A | 1/2000 |
| JP | 2007-253715 A | 10/2007 |
| WO | WO 2014/042007 A1 | 3/2014 |
| WO | WO 2017/077808 A1 | 5/2017 |

OTHER PUBLICATIONS

Dec. 4, 2020, Chinese Office Action issued for related CN Application No. 201810585706.7.

* cited by examiner

HYBRID VEHICLE

CROSS-REFERENCE TO RELATED APPLICATION

The present application claims the benefit of priority of Japanese Patent Application No. 2017-118802, filed on Jun. 16, 2017, the content of which is incorporated herein by reference.

BACKGROUND

1. Field of the Invention

The present invention relates to a hybrid vehicle.

2. Description of the Related Art

JP-A-1992-322105 discloses a regenerative energy absorbing device which effectively absorbs excessive regenerative energy when the energy is excessively generated in a hybrid vehicle.

During regenerative braking of the hybrid vehicle, an inverter is controlled to use the regenerative energy generated in a motor for charging a battery. However, when the voltage of the battery is equal to or higher than a predetermined value, fuel supply to an engine is stopped and the inverter is operated, to absorb that a part of the energy generated at the time of regeneration by motor driving of the generator with the engine as a load.

In the regenerative energy absorbing device of JP-A-1992-322105 described above, the regenerative energy is absorbed by driving of the generator with the engine as a load, and thus when the amount of the regenerative energy to be absorbed is large, the rotational speed of the engine, which is the load of the generator, is increased. However, when the rotational speed of the engine is high, noise generated with the rotation increases, and thus the so-called a noise vibration (NV) performance deteriorates.

SUMMARY

An object of the invention is to provide a hybrid vehicle capable of consuming regenerative electric power without sudden change even when an electric power amount generated at the time of a regenerative operation of a rotating electric machine greatly exceeds a chargeable amount of an electric capacitor.

According to a first aspect of the invention, there is provided a hybrid vehicle including: an internal combustion engine; a first rotating electric machine configured to generate electricity by a power of the internal combustion engine; an electric capacitor configured to be charged and discharged; and a second rotating electric machine which is connected to a drive wheel, the second rotating electric machine configured to be driven by power supply from at least one of the electric capacitor and the first rotating electric machine; a geographical information acquisition unit configured to acquire geographical information including a road on which the hybrid vehicle is scheduled to travel; and a control unit configured to control a charging operation for charging the electric capacitor with power generated during a regenerative operation of the second rotating electric machine or an electricity waste operation for consuming the power by the hybrid vehicle, wherein: the control unit starts the electricity waste operation when the remaining capacity of the electric capacitor becomes equal to or greater than a threshold value during the regenerative operation of the second rotating electric machine; and the control unit sets the threshold value based on the geographical information acquired by the geographical information acquisition unit.

According to a second aspect of the invention, in the hybrid vehicle according to the first aspect, the control unit lowers the threshold value when the control unit predict that a state of the electric capacitor becomes a fully charged state during the regenerative operation of the second rotating electric machine in a case that all electric power generated during the regenerative operation of the second rotating electric machine is charged to the electric capacitor, based on the geographical information.

According to a third aspect of the invention, in the hybrid vehicle according to the first aspect or the second aspect, the control unit predicts whether or not a state of the electric capacitor becomes a fully charged state during the regenerative operation of the second rotating electric machine based on; a predicted change amount of potential energy of the hybrid vehicle based on the geographical information; and a remaining capacity of the electric capacitor, and the control unit sets the threshold to be low, as the predicted change amount of the potential energy of the hybrid vehicle based on the geographical information is large, when the control unit predict that the state of the electric capacitor becomes the fully charged state, and the control unit lowers the threshold value.

According to a fourth aspect of the invention, in the hybrid vehicle according to any one of the first to third aspects, the control unit sets the threshold value to be low, as a traveling speed of the hybrid vehicle during the regenerative operation of the second rotating electric machine is high.

According to a fifth aspect of the invention, in the hybrid vehicle according to the first aspect or the second aspect, the control unit predicts whether or not a state of the electric capacitor becomes a fully charged state during the regenerative operation of the second rotating electric machine based on: a predicted change amount of potential energy of the hybrid vehicle based on the geographical information; and a remaining capacity of the electric capacitor, and the control unit sets the threshold to be low, as the regenerative electric power amount of the second rotating electric machine generated per unit time is large, when the control unit predicts that the state of the electric capacitor becomes the fully charged state, and the control unit lowers the threshold value.

According to a sixth aspect of the invention, in the hybrid vehicle according to the first aspect or the second aspect, the control unit predicts whether or not a state of the electric capacitor becomes a fully charged state during the regenerative operation of the second rotating electric machine based on: a radius of curvature of the road on which the hybrid vehicle is scheduled to travel based on the geographic information; and the remaining capacity of the electric capacitor, and the control unit sets the threshold value to be low as the radius of curvature of the road on which the hybrid vehicle is scheduled to travel is small when the control unit predicts that the state of the electric capacitor becomes the fully charged state, and the control unit lowers the threshold value.

According to a seventh aspect of the invention, in the hybrid vehicle according to any one of the first to sixth aspects, the electricity waste operation is performed by supplying the electric power generated during the regenerative operation of the second rotating electric machine to the first rotating electric machine and setting the internal combustion engine as a load of the first rotating electric machine operating as the electric motor, and the control unit sets an allowable value of a rotational speed of the internal combustion engine during the electricity waste operation to be high as the travelling speed of the hybrid vehicle is high.

According to an eighth aspect of the invention, in the hybrid vehicle according to any one of the first to seventh aspects, when the hybrid vehicle travels on a downhill road, the control unit predicts the regenerative electric power amount which is acquired by the regenerative operation of the second rotating electric machine until the hybrid vehicle goes down the downhill road based on the geographical information, and the control unit changes a start timing of the electricity waste operation according to the setting of the threshold value so that a state of the electric capacitor becomes a fully charged state when the hybrid vehicle goes down the downhill road.

According to a ninth aspect of the invention, in the hybrid vehicle according to any one of the first to eighth aspects, the hybrid vehicle further includes a mechanical brake configured to brake the hybrid vehicle, and the control unit lowers the threshold value when the restriction on the use of the mechanical brake is predicted during the regenerative operation of the second rotating electric machine.

According to a tenth aspect of the invention, in the hybrid vehicle according to any one of the first to ninth aspects, a lower limit is set to the threshold value set by the control unit.

According to the first aspect, the threshold value related to the remaining capacity of the electric capacitor is variably set based on the geographical information including information on the road on which the hybrid vehicle is scheduled to travel, so that it is possible to change the timing to start the electricity waste operation when the second rotating electric machine performs the regenerative operation. As a result, even when the electric power amount generated during the regenerative operation of the second rotating electric machine greatly exceeds the chargeable amount of the electric capacitor, the regenerative electric power can be consumed without sudden change.

According to the second aspect, in a case where, if all electric power generated during the regenerative operation of the second rotating electric machine is charged to the electric capacitor, it is predicted based on the geographical information that the state of the electric capacitor becomes the fully charged state during the regenerative operation of the second rotating electric machine, the threshold value is lowered, and thus it is possible to advance the timing to start the electricity waste operation. In the case of using a rotating body for electricity waste, when the electricity waste operation is started at an early timing, the rotational speed of the rotating body can be suppressed, and thus it is possible to suppress an increase in noise due to a sudden change in the rotational speed and it is possible to improve the NV performance of the hybrid vehicle. Also, in the case of using a heating element or a heat absorber for the electricity waste, when the electricity waste operation is started at an early timing, a sharp temperature change can be suppressed, so that it is possible to reduce thermal stress.

Since the regenerative electric power amount is large as a predicted change amount of the potential energy of the hybrid vehicle is large, when the rotating body is used for the electricity waste, it is possible to suppress the deterioration of the NV performance by setting the threshold value to be low and advancing the timing to start the electricity waste operation as in the third aspect. Therefore, when the heating element or the heat absorber is used for the electricity waste, it is possible to reduce thermal stress.

Since the regenerative electricity power amount is large as the travelling speed of the hybrid vehicle is high, when a rotating body is used for the electricity waste, it is possible to suppress the deterioration of the NV performance by setting the threshold value to be low and advancing the timing to start the electricity waste operation as in the fourth aspect. Therefore, when the heating element or the heat absorber is used for the electricity waste, it is possible to reduce thermal stress.

When the rotating body is used for the electricity waste, it is possible to suppress the deterioration of the NV performance by setting the threshold to be low as the regenerative electric power amount generated per unit time is large and advancing the timing to start the electricity waste operation as in the fifth aspect. Therefore, when the heating element or the heat absorber is used for the electricity waste, it is possible to reduce thermal stress.

The smaller the radius of curvature of the road on which the hybrid vehicle is scheduled to travel, the more likely the hybrid vehicle decelerates significantly, and thus it is expected that the regenerative electric power amount is large. Therefore, when the rotating body is used for the electricity waste, it is possible to suppress the deterioration of the NV performance by setting the threshold value to be low to advance the timing to start the electricity waste operation as in the sixth aspect. As a result, when the heating element or the heat absorber is used for the electricity waste, it is possible to reduce thermal stress.

Despite the low travelling speed of the hybrid vehicle, when the rotational speed of the internal combustion engine is high, the sound generated by the rotation of the internal combustion engine becomes a factor for the occupant of the hybrid vehicle to feel uncomfortable. However, when the rotational speed of the internal combustion engine is high and the travelling speed of the hybrid vehicle is high, even if the sound accompanying the rotation of the internal combustion engine is large, the occupant does not feel uncomfortable. For this reason, according to the seventh aspect, the higher the travelling speed of the hybrid vehicle is, the higher the allowable value of the rotational speed of the internal combustion engine during the electricity waste operation is set. Therefore, the occupant of the hybrid vehicle does not feel uncomfortable caused by the sound accompanying the rotation of the internal combustion engine.

According to the eighth aspect, since the state of the electric capacitor becomes the fully charged state at the time when the hybrid vehicle goes down the downhill road according to the setting of the threshold value, it is possible to charge the regenerative electric power most efficiently and it is possible to prevent the deterioration of the NV performance and an increase in the thermal stress caused by regenerative operation of the second rotating electric machine.

According to the ninth aspect, when the restriction on the use of the mechanical brake is predicted, the timing to start the electricity waste operation is advanced by lowering the threshold value, so that the regenerative operation of second rotating electric machine can be performed efficiently.

According to the tenth aspect, since a lower limit is set to the threshold value set by the control unit, even when the travelling direction of the vehicle changes and electric power is required for traveling, the electric capacitor can supply electric power to the second rotating electric machine.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, embodiments of the invention will be described with reference to drawings.

A hybrid electrical vehicle (HEV) includes a rotating electric machine and an internal combustion engine and travels by a driving force of the rotating electric machine and/or the internal combustion engine according to the travelling state of the vehicle. There are two main types of the HEV which are a series type and a parallel type. The HEV of the series type travels by the power of the rotating electric machine. The internal combustion engine is mainly used for power generation and the electric power generated by another rotating electric machine by the power of the internal combustion engine is charged to a battery or supplied to the rotating electric machine. On the other hand, the HEV of the parallel type travels by the driving force of one or both of the rotating electric machine and the internal combustion engine. In addition, an HEV capable of switching between both types has been known. In the HEV of this type, a clutch is disengaged or engaged (connected or disconnected) according to the travelling state, so that a transmission system of the driving force is switched into one of the series type and the parallel type.

Figure 1:
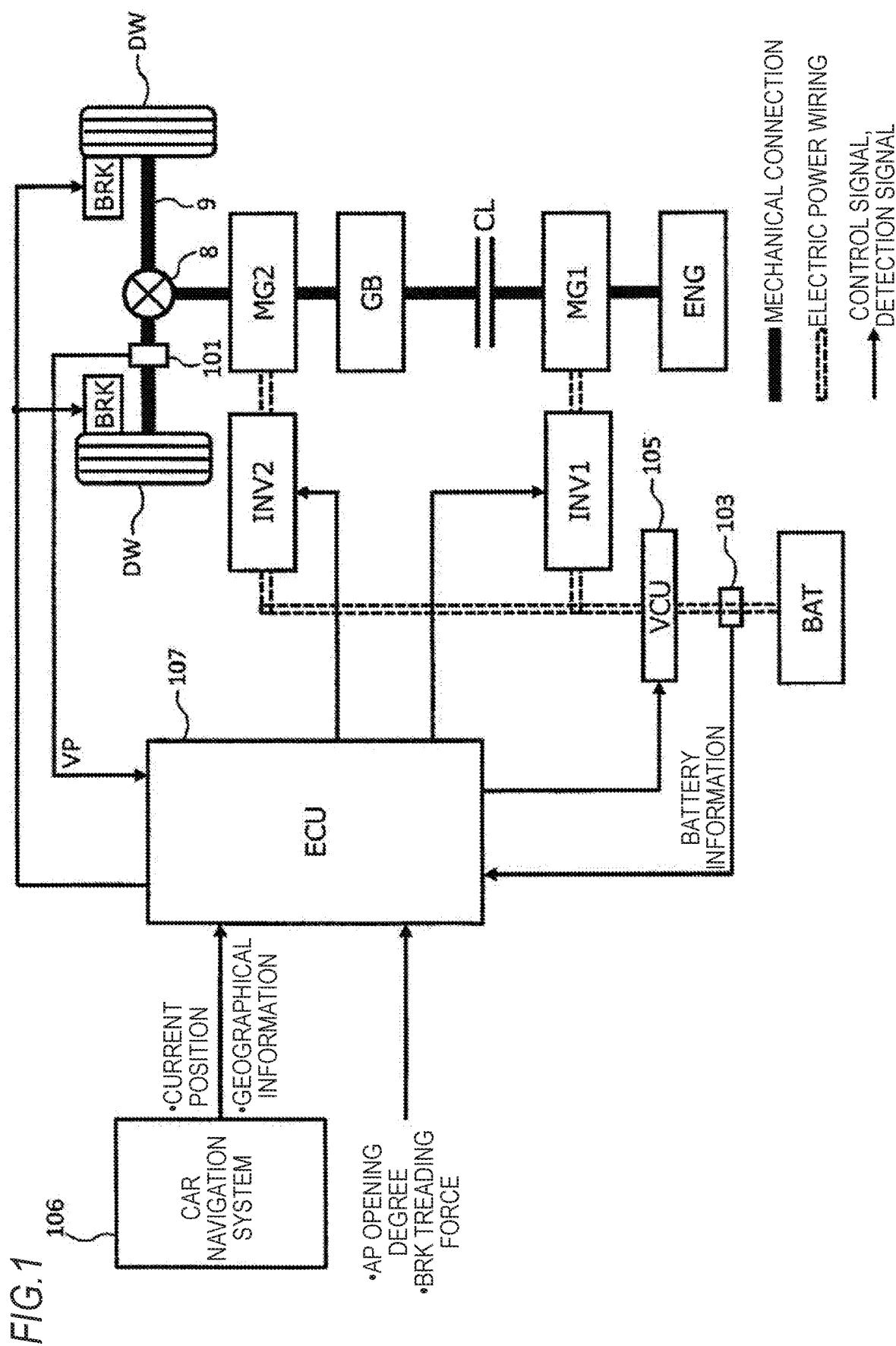
FIG. 1 is a block diagram illustrating an internal configuration of an HEV capable of switching between a series type and a parallel type.

FIG. 1 is a block diagram illustrating an internal configuration of an HEV capable of switching between a series type and a parallel type. An HEV (hereinafter, simply referred to as a "vehicle") illustrated in FIG. 1 includes an internal combustion engine ENG for outputting rotating power, a first rotating electric machine MG1, a second rotating electric machine MG2, a lock-up clutch (hereinafter, simply referred to as a "clutch") CL, a gear box (hereinafter, simply referred to as a "gear") GB, a vehicle speed sensor 101, a battery sensor 103, an electric capacitor BAT, a voltage control unit (VCU) 105, a first inverter INV1, a second inverter INV2, a brake BRK, a car navigation system 106, and an electronic control unit (ECU) 107. Further, in FIG. 1, a thick solid line indicates a mechanical connection, a double-dotted line indicates an electric power wiring, and a thin solid arrow indicates a control signal or a detection signal.

In a state where the clutch CL is disengaged, the internal combustion engine ENG drives the first rotating electric machine MG1 as a generator and can also function as a load of the first rotating electric machine MG1 operating as an electric motor when the vehicle brakes. However, when the clutch CL is engaged, the power output by the internal combustion engine ENG is transmitted, as mechanical energy for the vehicle to travel, to drive wheels DW, DW via the first rotating electric machine MG1, the clutch CL, the gear GB, the second rotating electric machine MG2, a differential gear 8, and a drive shaft 9.

The first rotating electric machine MG1 is driven by the power of the internal combustion engine ENG and generates electric power. In addition, the first rotating electric machine MG1 can operate as an electric motor when the vehicle brakes.

In the second rotating electric machine MG2, a rotor operates as an electric motor by electric power supplied from at least one of the electric capacitor BAT and the first rotating electric machine MG1 and generates power for the vehicle to travel. The torque generated by the second rotating electric machine MG2 is transmitted to the drive wheels DW, DW via the differential gear 8 and the drive shaft 9. In addition, the second rotating electric machine MG2 can operate as a generator when the vehicle brakes.

The clutch CL engages or disengages (connects or disconnects) a transmission path of the power from the internal combustion engine ENG to the drive wheels DW, DW according to an instruction from the ECU 107. When the clutch CL is disengaged, the power output by the internal combustion engine ENG is not transmitted to the drive wheels DW, DW and, when the clutch CL is engaged, the power output by the internal combustion engine ENG is transmitted to the drive wheels DW, DW. The gear GB includes a variable gear position or a fixed gear position. The gear GB shifts the power from the internal combustion engine ENG at a predetermined gear ratio and transmits the power to the drive wheel DW. The gear ratio at the gear GB is changed in accordance with an instruction from the ECU 107.

The electric capacitor BAT has a plurality of storage cells connected in series and supplies a high voltage of, for example, 100 V to 200 V. The storage cell is, for example, a lithium ion battery or a nickel hydrogen battery.

The vehicle speed sensor 101 detects a traveling speed (vehicle speed VP) of the vehicle. A signal indicating the vehicle speed VP detected by the vehicle speed sensor 101 is sent to the ECU 107.

The battery sensor 103 detects the output (terminal voltage, charge/discharge current) of the electric capacitor BAT. Signals indicating the terminal voltage, charging/discharging current, and the like detected by the battery sensor 103 are sent to the ECU 107 as battery information.

The VCU 105 boosts the output voltage of the electric capacitor BAT when the second rotating electric machine MG2 operates as an electric motor. The VCU 105 steps down the output voltage of the second rotating electric machine MG2 when the electric capacitor BAT is charged with regenerative electric power which is generated by the second rotating electric machine MG2 and converted into direct current during braking of the vehicle. Further, the VCU 105 steps down the electric power which is generated by the first rotating electric machine MG1 by driving of the internal combustion engine ENG and converted into direct current. The electric power stepped down by the VCU 105 is charged to the electric capacitor BAT.

Figure 2:
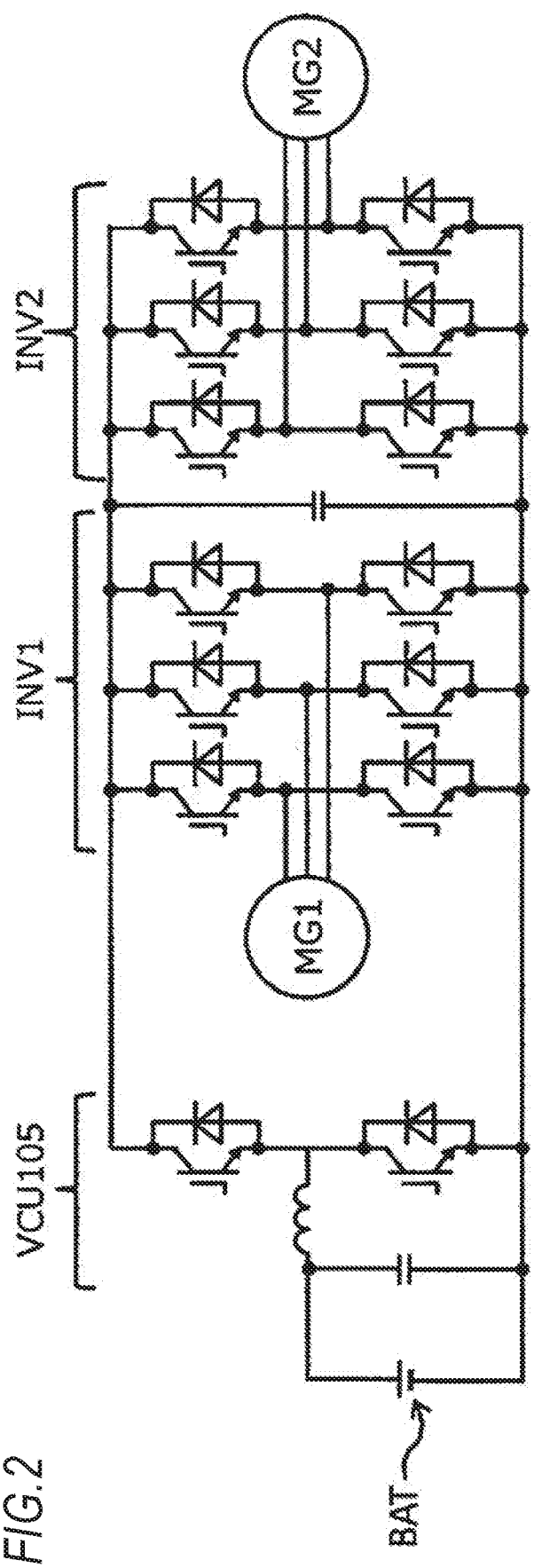
FIG. 2 is an electric circuit diagram illustrating a relationship between an electric capacitor, a VCU, a first inverter, a second inverter, a first rotating electric machine, and a second rotating electric machine.

FIG. 2 is an electric circuit diagram illustrating a relationship between the electric capacitor BAT, the VCU 105, the first inverter INV1, the second inverter INV2, the first rotating electric machine MG1, and the second rotating electric machine MG2. As illustrated in FIG. 2, the VCU 105 boosts an output-side V2 voltage to a voltage higher than a V1 voltage by performing on/off switching operation of two switching elements using the V1 voltage output from the electric capacitor BAT as an input voltage. When the two switching elements of the VCU 105 do not perform on/off switching operation, the voltage V2 is equal to the voltage V1.

The first inverter INV1 converts the AC voltage generated by the first rotating electric machine MG1 by the driving of the internal combustion engine ENG into a DC voltage. Further, the first inverter INV1 converts the DC voltage which is generated by the second rotating electric machine MG2 during braking of the vehicle and converted by the second inverter INV2 into the AC voltage and supplies a three-phase current to the first rotating electric machine MG1. The second inverter INV2 converts the DC voltage into the AC voltage and supplies a three-phase current to the second rotating electric machine MG2. The second inverter INV2 converts the AC voltage generated by the second rotating electric machine MG2 during braking of the vehicle into the DC voltage.

The brake BRK is a mechanical brake. That is, the brake BRK brakes the vehicle by hydraulic pressure or the like which is controlled according to the operation of a brake pedal by a driver of the vehicle or instructions from the ECU 107.

A car navigation system 106 has a global positioning system (GPS) receiving unit for receiving radio waves from the GPS satellites and a map data memory for storing data on the road map and guides a preset traveling route, and the like. The current position indicated by the radio wave received by the GPS receiving unit and the geographical information of the traveling route are sent to the ECU 107. The geographical information includes the altitude of the point on the road, the radius of curvature of the curved road, and the like on which the vehicle is scheduled to travel. The car navigation system 106 is not limited to a device having an input interface directly operated by a user to set a destination and the like. The car navigation system 106 may be a device which has a GPS receiving unit, a mat data memory, and the like, but may not include the input interface described above.

The ECU 107 controls the first inverter INV1, the second inverter INV2, and the VCU 105 according to the state of the vehicle, so that the ECU 107 performs control suitable for the state of the vehicle. Signals indicating an accelerator pedal opening degree (AP opening degree) according to an accelerator pedal operation by a driver of the vehicle, a signal indicating a brake pedal treading force (BRK treading force) according to a brake pedal operation by a driver, a signal indicating the vehicle speed VP obtained from the vehicle speed sensor 101, and a signal indicating the battery information obtained from the battery sensor 103 are input to the ECU 107.

Figure 3:
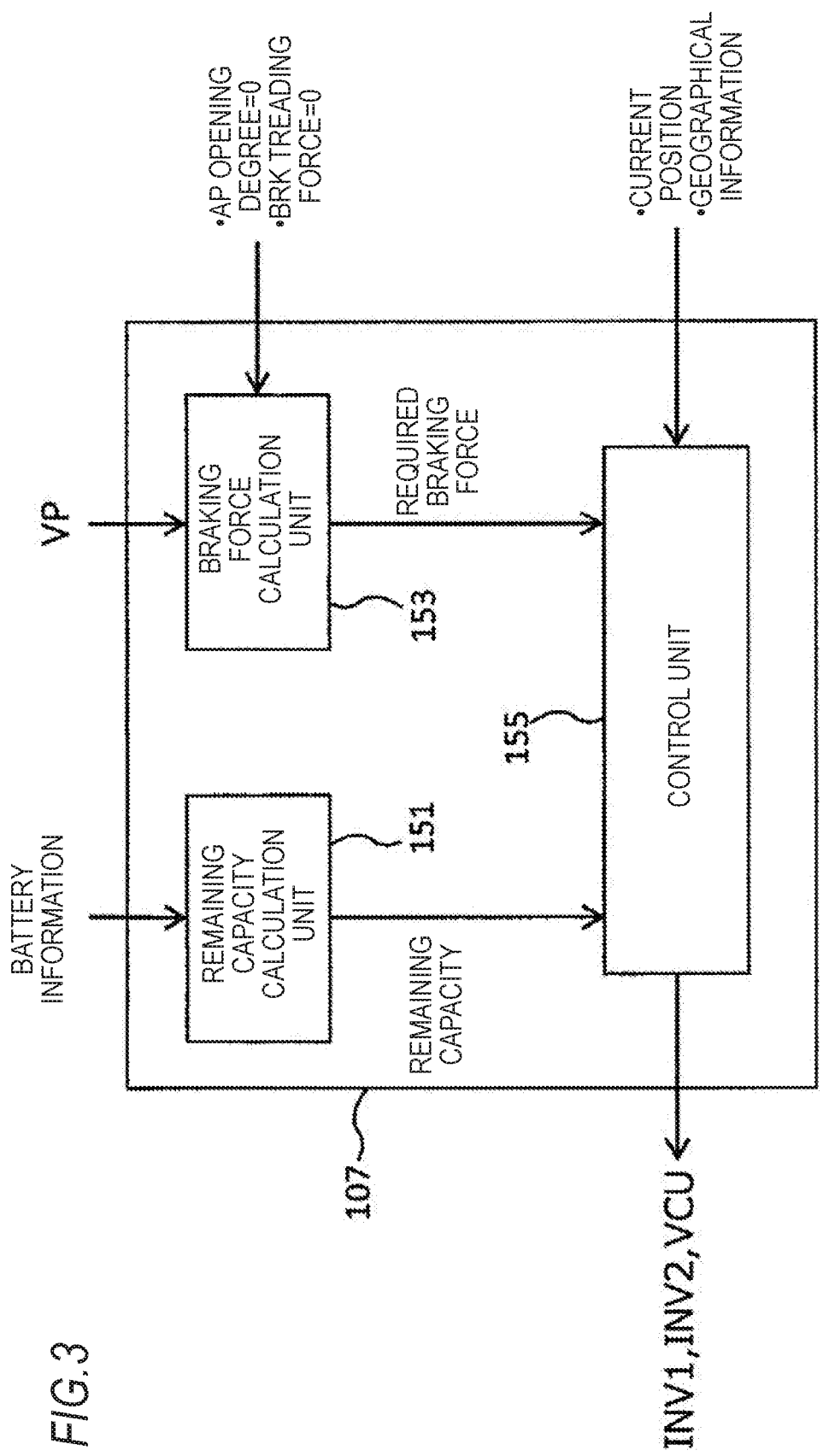
FIG. 3 is a block diagram illustrating an internal configuration of an ECU which performs control suitable for a state of a vehicle.

FIG. 3 is a block diagram illustrating an internal configuration of the ECU 107 which performs control suitable for the state of the vehicle. As illustrated in FIG. 3, the ECU 107 has a remaining capacity calculation unit 151, a braking force calculation unit 153, and a control unit 155. Each constituent element of the ECU 107 will be described below.

Based on the battery information obtained from the battery sensor 103, the remaining capacity calculation unit 151 calculates the remaining capacity (SOC: State Of Charge) which is a variable representing the state of charge of the electric capacitor BAT by percentage. When the remaining capacity is 100%, the electric capacitor BAT is in a fully charged state.

Based on the vehicle speed VP obtained from the vehicle speed sensor 101, the braking force calculation unit 153 calculates the braking force output when the vehicle travels on a downhill road in a state where neither the accelerator pedal nor the brake pedal is trodden (AP opening degree=0 and BRK treading force=0).

Based on the remaining capacity calculated by the remaining capacity calculation unit 151, the braking force calculated by the braking force calculation unit 153, and the current position and the geographical information obtained from the car navigation system 106, the control unit 155 selects in which type braking control is performed when the vehicle travels on a downhill road in a state where neither the accelerator pedal nor the brake pedal is trodden and the control unit 155 controls at least one of the first inverter INV1, the second inverter INV2, and the VCU 105 according to the selected type.

Figure 4A:
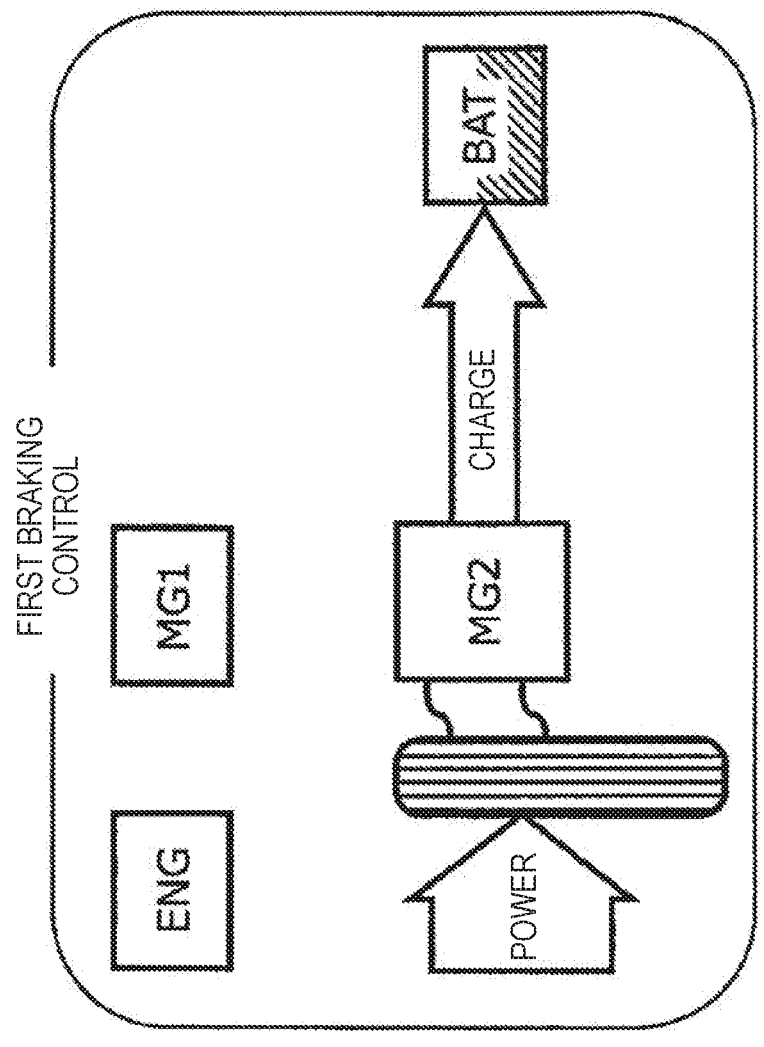
FIG. 4A is an explanatory view illustrating the flow of energy during a first braking control.
Figure 4B:
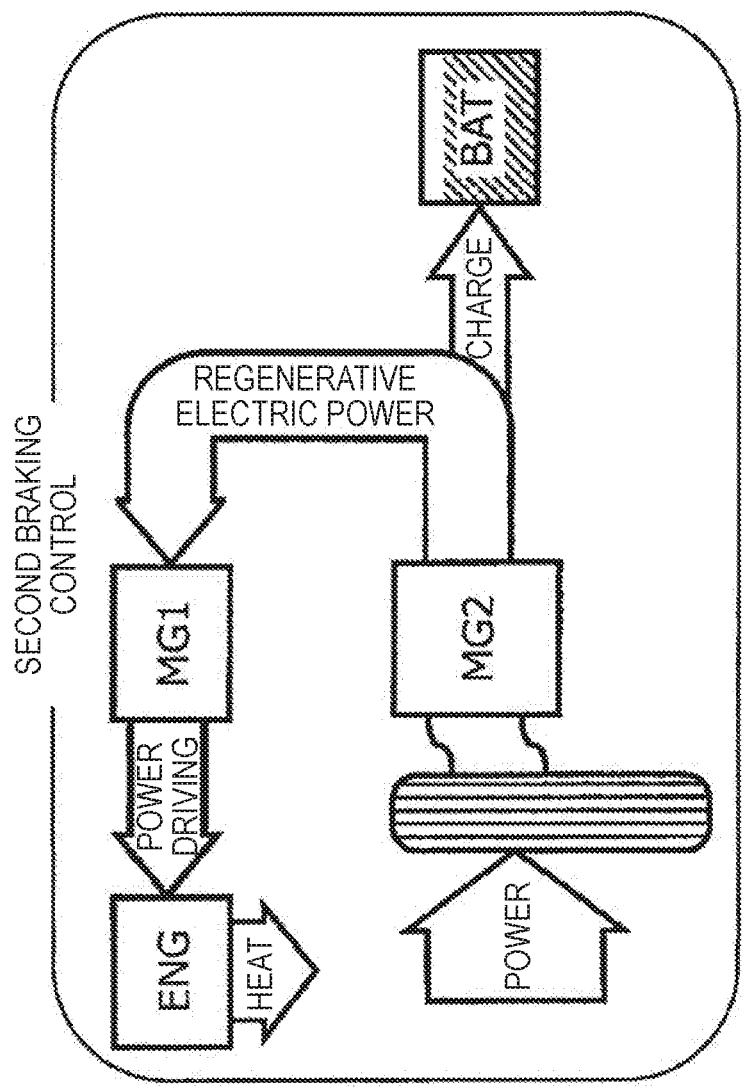
FIG. 4B is an explanatory diagram illustrating the flow of energy during a second braking control.
Figure 4C:
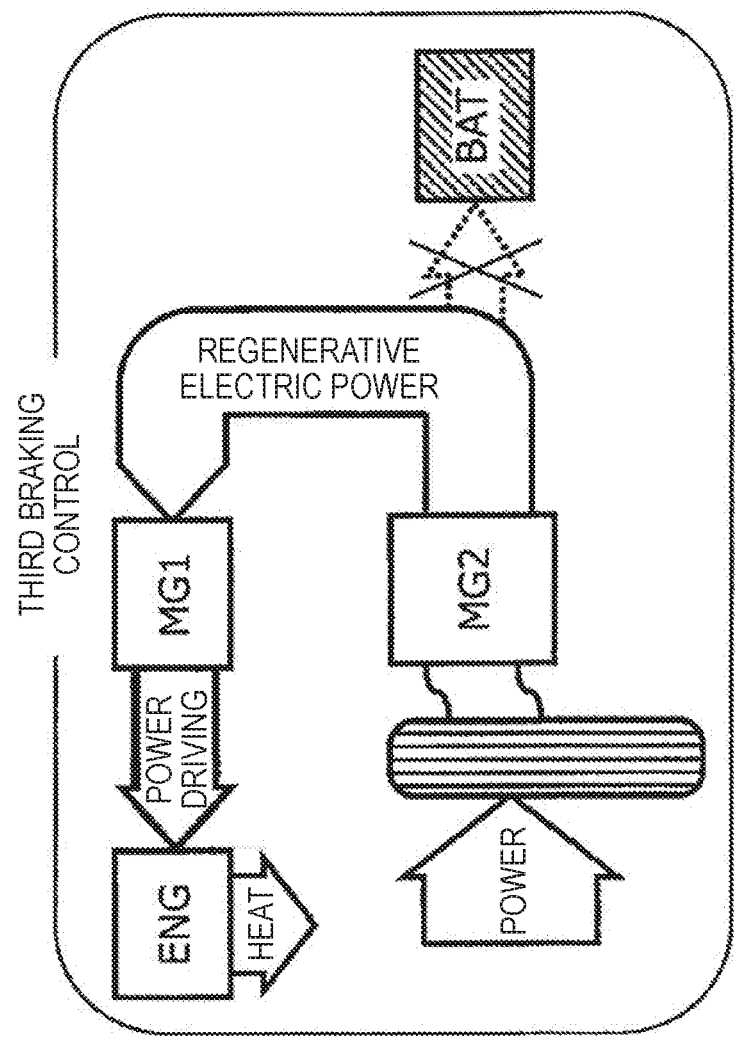
FIG. 4C is an explanatory diagram illustrating the flow of energy during a third braking control.

There are three types of braking control that the control unit 155 can select when the vehicle brakes. FIGS. 4A to 4C illustrate respective states of three braking controls. FIG. 4A is an explanatory view illustrating the flow of energy during a first braking control, FIG. 4B is an explanatory diagram illustrating the flow of energy during a second braking control, and FIG. 4C is an explanatory diagram illustrating the flow of energy during a third braking control.

In the first braking control illustrated in FIG. 4A, the second rotating electric machine MG2 operates as a generator by the power of the rotating drive wheel DW and the regenerative electric power generated by the second rotating electric machine MG2 is charged to the electric capacitor BAT. In the second braking control shown in FIG. 4B, the second rotating electric machine MG2 operates as a generator by the power of the rotating drive wheel DW and a part of the regenerative electric power generated by the second rotating electric machine MG2 is charged to the electric capacitor BAT, and further the remaining regenerative electric power is consumed by performing power-driving of the first rotating electric machine MG1 to drive the internal combustion engine ENG in reverse. The allowable value of the rotational speed of the internal combustion engine ENG when the second braking control is performed is set to be high as the vehicle speed VP is high. In the third braking control shown in FIG. 4C, the second rotating electric machine MG2 operates as a generator by the power of the rotating drive wheel DW. However, the electric capacitor BAT is in a fully charged state, and thus regenerative electric power generated by the second rotating electric machine MG2 is not charged to the electric capacitor BAT but is consumed by performing power-driving of the first rotating electric machine MG1 to drive the internal combustion engine ENG in reverse.

Thus, in any of the first to third braking control, regenerative braking where the second rotating electric machine MG2 operates as a generator is performed. In the second braking control and the third braking control, the first rotating electric machine MG1 is driven as an electric motor by at least a part of the regenerative electric power and the internal combustion engine ENG is set as the load of the first rotating electric machine MG1. That is, in the second braking control and the third braking control, at least a part of the regenerative electric power is wasted.

Figure 5:
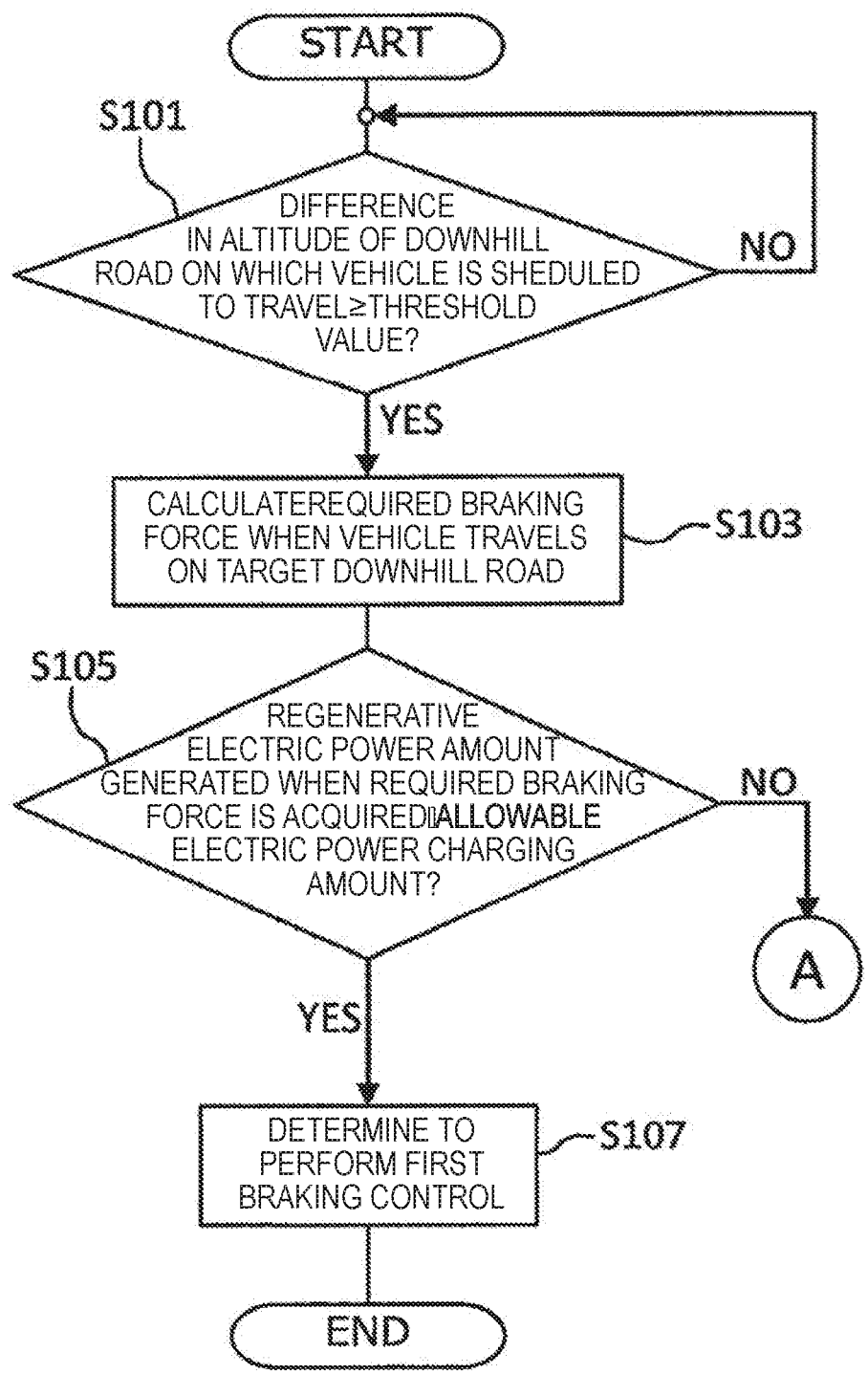
FIG. 5 is a flowchart illustrating a process performed by the ECU when the vehicle travels on a downhill road.
Figure 6:
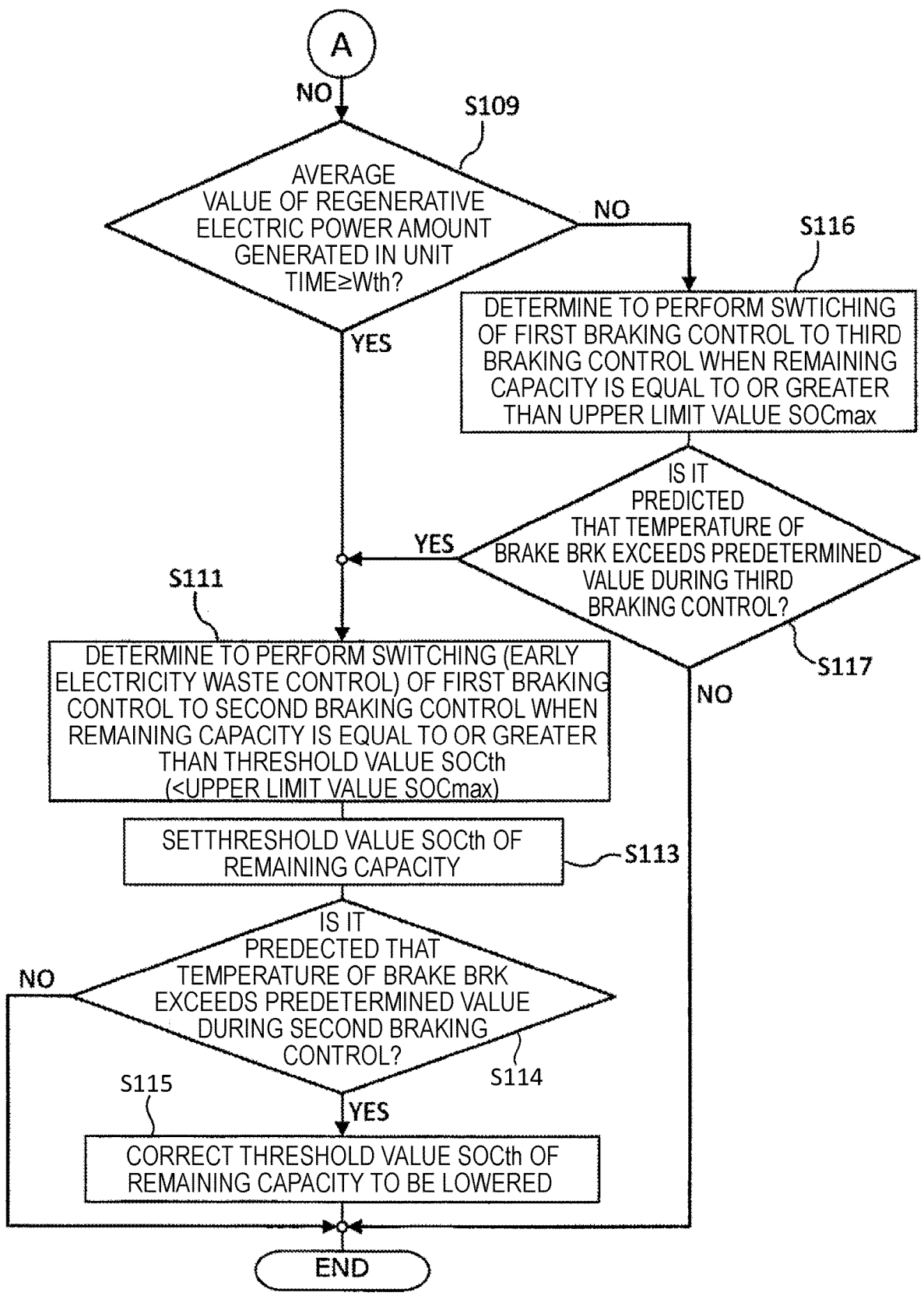
FIG. 6 is a flowchart illustrating a process performed by the ECU when the vehicle travels on a downhill road.

Next, the process performed by the ECU 107 when the vehicle travels on a downhill road will be described in detail with reference to FIGS. 5 and 6. FIGS. 5 and 6 are flowcharts illustrating a process performed by the ECU 107 when the vehicle travels on a downhill road. In addition, while the vehicle travels on a downhill road, the vehicle is subjected to braking control by one of the first to third braking control described above.

As illustrated in FIG. 5, based on the current position and geographic information obtained from car navigation system 106, the control unit 155 of the ECU 107 determines whether or not the difference in altitude of the downhill road (hereinafter referred to as a "target downhill road") on which the vehicle traveling on a flat road is going to travel is equal to or greater than a threshold value (Step S101) and if the difference in the altitude is equal to or greater than the threshold value, the process proceeds to Step S103. In Step S103, based on the vehicle speed VP travelling on a flat road and the difference in altitude, the braking force calculation unit 153 of the ECU 107 calculates a cumulative value of the braking force (hereinafter referred to as a "required braking force") until the vehicle goes down the target downhill road in a state where neither the accelerator pedal nor the brake pedal is trodden.

Based on the remaining capacity calculated by the remaining capacity calculation unit 151 of the ECU 107, the required braking force calculated in Step S103, and the current position and the geographical information obtained from the car navigation system 106, the control unit 155 determines braking control when the vehicle travels on the target downhill road. In order to carry out the determination process, when the vehicle travels on the target downhill road, first, the control unit 155 compares the amount of regenerative electric power generated when the required braking force is acquired by regenerative braking described above with the amount of electric power (hereinafter referred to as a "allowable electric power charging amount") by which the electric capacitor BAT can be charged until the electric capacitor BAT is fully charged, as illustrated in Step S105, and if the amount of regenerative electric power is equal to or less than the allowable electric power charging amount, the process proceeds to Step S107 and if the amount of regenerative electric power exceeds the allowable electric power charging amount, the process proceeds to Step S109. In step S107, the control unit 155 determines to perform the first braking control until the vehicle goes down the target downhill road while the vehicle travels on the target downhill road.

In Step S109, the control unit 155 determines whether the average value of the regenerative electric power amount generated in a unit time is equal to or greater than a predetermined value Wth while the vehicle travels on the target downhill road and if the average value is equal to or greater than the predetermined value Wth, the process proceeds to Step S111 and if it is less than the predetermined value Wth, the process proceeds to Step S116. In Step S111, the control unit 155 performs first braking control immediately after the start of travelling on the target downhill road and switches to second braking control when the remaining capacity of the electric capacitor BAT becomes equal to or larger than a threshold value SOCth, then the control unit 155 decides to perform second braking control until the vehicle goes down the target downhill road. The threshold value SOCth of the remaining capacity of the electric capacitor BAT is less than an upper limit value SOCmax by which charging of the electric capacitor BAT is allowed. Therefore, switching from the first braking control to the second braking control is performed earlier than in the case where the threshold value SOCth is set to the upper limit value SOCmax. That is, the first rotating electric machine MG1 is driven as an electric motor by the regenerative electric power and waste of electricity is quickly started by setting the internal combustion engine ENG as the load of the first rotating electric machine MG1.

When the determination is performed in Step S111, the control unit 155 sets a threshold value SOCth of the remaining capacity of the electric capacitor BAT (Step S113). The control unit 155 sets the threshold value SOCth low as the difference in altitude of the target downhill road is large. Further, the threshold value SOCth is set to be low as the vehicle speed VP is high. Also, the threshold value SOCth is set to be low as the average value of the regenerative electric power amount generated per unit time is large. In addition, when there is a curve on the target downhill road, there is a high possibility that the vehicle will greatly decelerate, and thus the threshold value SOCth is set to be low as the radius of curvature of the target downhill road is small. The control unit 155 may set the threshold value SOCth based on the amount of electric power charged to the electric capacitor BAT during first braking control and the amount of electric power charged to the electric capacitor BAT during second braking control so that the electric capacitor BAT is in a fully charged state when the vehicle goes down the target downhill road.

Further, a lower limit is set to the threshold value SOCth set by the control unit 155. The lower limit is a target value of the remaining capacity of the electric capacitor BAT to be converged when the vehicle travels and, for example, 60% of the remaining capacity is set to the lower limit of the threshold value SOCth. In this way, by setting the lower limit to the threshold value SOCth set by the control unit 155, even when the traveling direction of the vehicle traveling on the target downhill road changes and electric power is required for travelling, the electric capacitor BAT can also supply electric power to the second rotating electric machine MG2.

After Step S113, when, during second braking control, since the required braking force cannot be achieved only with regenerative braking, the brake BRK is used, the control unit 155 determines whether or not the temperature of the brake BRK is predicted to exceed a predetermined value during the second braking control (Step S114). If it is predicted that the temperature of the brake BRK exceeds the predetermined value (Yes in Step S114), the process proceeds to Step S115 and if it is predicted that the temperature of the brake BRK does not exceed the predetermined value (No in Step S114), the series of processes ends. In Step S115, the control unit 155 corrects the threshold value SOCth set in Step S113 to a value further reduced by a predetermined value.

In Step S116, the control unit 155 performs the first braking control immediately after the start of the travelling on the target downhill road and switches braking control to third braking control when the remaining capacity of the electric capacitor BAT reaches the upper limit value SOCmax, and then the control unit 155 determines to perform third braking control until the vehicle goes down the target downhill road. Next, when, during third braking control, since the required braking force cannot be achieved only with regenerative braking, the brake BRK is used, the control unit 155 determines whether or not the temperature of the brake BRK is predicted to exceed a predetermined value during the third braking control (Step S117). If it is predicted that the temperature of the brake BRK exceeds the predetermined value (Yes in Step S117), the determination made in Step S116 is canceled and the process proceeds to Step S111. That is, when it is predicted that the use of the brake BRK is restricted during third braking control, the control unit 155 performs first braking control immediately after the start of travelling on the target downhill road and if the remaining capacity of the electric capacitor BAT becomes equal to or larger than the threshold value SOCth, braking control is switched to second braking control, and then it is determined to perform second braking control until the vehicle goes down the target downhill road. On the other hand, if it is predicted in Step S117 that the temperature of the brake BRK does not exceed the predetermined value (No in Step S117), the series of processes ends while the determination made in Step S116 is maintained.

Figure 7:
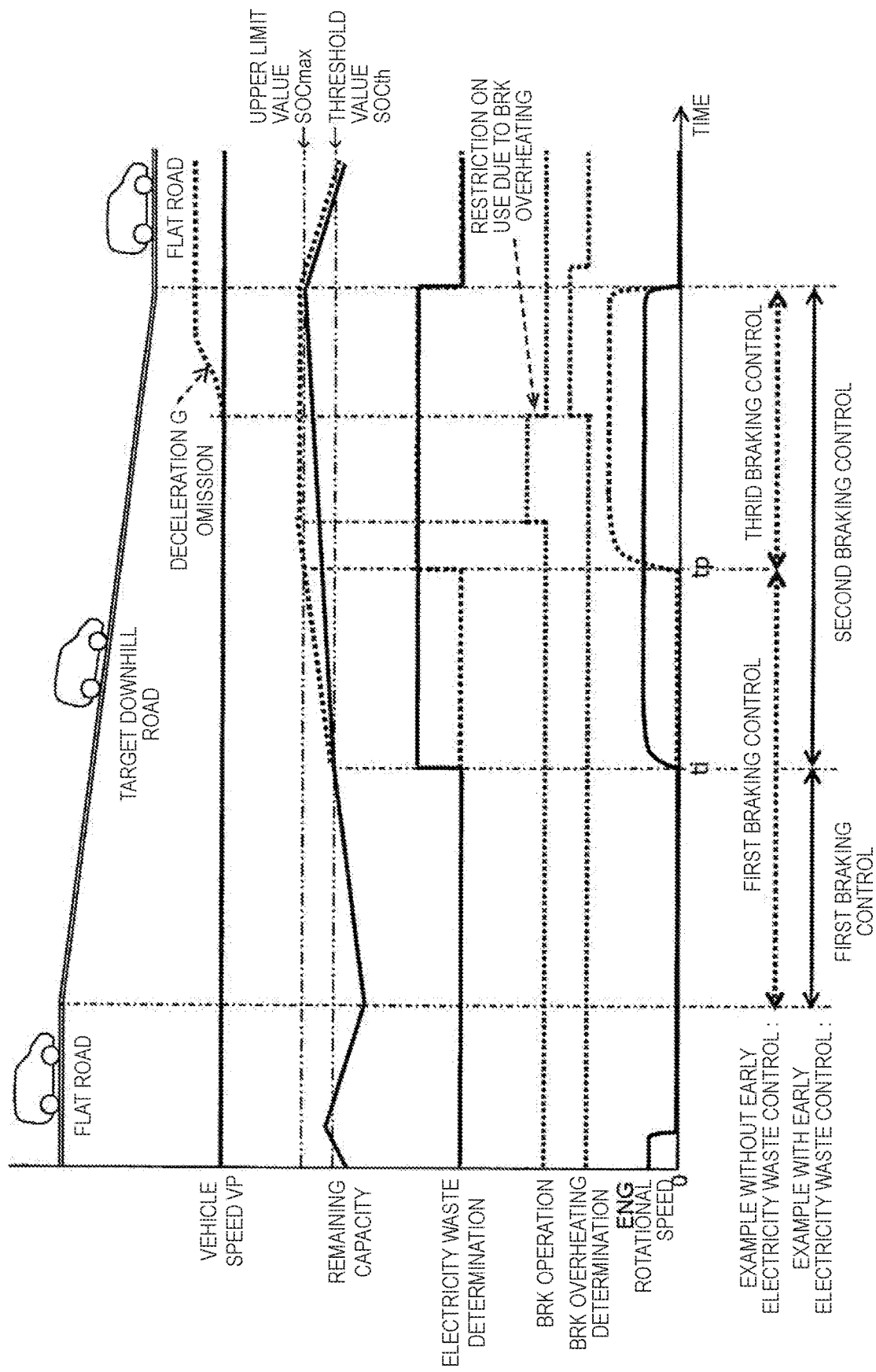
FIG. 7 is a diagram illustrating an example of changes with time of each parameter when a vehicle travels on a road (flat road→downhill road→flat road) on which the vehicle is scheduled to travel.

FIG. 7 is a diagram illustrating an example of changes with time of each parameter when the vehicle travels on a road (flat road→downhill road→flat road) on which the vehicle is scheduled to travel. In FIG. 7, changes in a case where the threshold value SOCth of the remaining capacity of the electric capacitor BAT is set to a value lower than the upper limit value SOCmax based on geographical information or the like, so that the braking control (second braking control) including waste of electricity is performed earlier is indicated by the solid line. Further, change in a case where, regardless of the geographical information or the like, braking control (third braking control) including waste of electricity is performed at the time when the remaining capacity of the electric capacitor BAT reaches the upper limit value SOCmax is indicated by the dotted line.

In the example illustrated in FIG. 7, the first braking control is performed when the vehicle moves from the flat road to the target downhill road and, in the example in which the early electricity waste control is not performed, braking control is switched to the third braking control at the time (tp) at which the remaining capacity of the electric capacitor BAT reaches the upper limit value SOCmax. When the remaining capacity reaches the upper limit value SOCmax, regenerative electric power cannot be charged to the electric capacitor BAT, and thus the required braking force is obtained by the electricity waste operation by third braking control. Therefore, if the required braking force is large, the rotational speed of the internal combustion engine ENG as a load is large, and thus the noise vibration (NV) performance of the vehicle is deteriorated. Further, when the braking force obtainable by the electricity waste operation is less than the required braking force, the brake BRK is used. However, when the brake BRK operates continuously, the use of the brake BRK is restricted due to overheating. In this case, the vehicle speed VP is increased above the desired value as indicated by the letters "Deceleration G Omission" in FIG. 7. On the other hand, in the example in which the early electricity waste control is performed as in the embodiment, braking control is switched to the second braking control at the time (ti) when the remaining capacity of the electric capacitor BAT reaches the threshold value SOCth set lower than the upper limit value SOCmax. After braking control is switched to the second braking control, the rotational speed of the internal combustion engine ENG as a load is gradually increased and the rate of charging the regenerative power to the electric capacitor BAT is reduced, and thus the electric capacitor BAT at the time when the vehicle goes down the target downhill road becomes a fully charged state.

As described above, according to the present embodiment, the threshold value SOCth related to the remaining capacity of the electric capacitor BAT is variably set based on the geographical information including information on the road on which the vehicle is scheduled to travel, so that it is possible to change the timing to shift to the braking control including the electricity waste when the second rotating electric machine MG2 performs the regenerative operation. Particularly, in a case where, if all electric power generated during the regenerative operation of the second rotating electric machine MG2 is charged to the electric capacitor BAT, it is predicted that the electric capacitor BAT becomes a fully charged state during the regenerative operation of the second rotating electric machine MG2, the threshold value SOCth is lowered, and thus it is possible to advance the timing to shift to the braking control including the electricity waste. As the timing to shift to the braking control including the waste electricity is advanced, the rotational speed of the internal combustion engine ENG can be reduced, and thus it is possible to suppress an increase in noise due to a sudden change in the rotational speed and it is possible to improve the NV performance of the vehicle.

Further, since the regenerated electric power amount is large as the difference in altitude of the target downhill road on which the vehicle is scheduled to travel is large, the threshold value SOCth is set to be low as the difference in altitude is large and the timing to shift to the braking control including the electricity waste is advanced, so that the NV performance of the vehicle can be improved. Also, since the regenerative electric power amount is large as the vehicle speed VP is high, the threshold SOCth is set to a low value as the vehicle speed VP is high to advance the timing to shift to the braking control including the electricity waste, so that the NV performance of the vehicle can be improved. Further, the threshold SOCth is set to be low as the regenerative electric power amount generated at unit time is large, so that the timing to shift to the braking control including the electricity waste is advanced, so that the NV performance of the vehicle can be improved. Also, as the radius of curvature of the target downhill road on which the vehicle is scheduled to travel is small, there is a high possibility that the vehicle will greatly decelerate. As a result, since it is expected that the regenerative electric power amount is large, as the radius of curvature becomes small, the threshold value SOCth is set to be low and the timing to shift to the braking control including the electricity waste is advanced, so that the NV performance of the vehicle can be improved.

Also, despite the low vehicle speed VP, when the rotational speed of the internal combustion engine ENG is high, the sound generated by the rotation of the internal combustion engine ENG becomes a factor for the occupant of the vehicle to feel uncomfortable. However, when the vehicle speed VP is high, even if the rotation speed of the internal combustion engine ENG is high and the sound accompanying the rotation of the internal combustion engine ENG is large, the occupant does not feel uncomfortable. For this reason, the higher the vehicle speed VP is, the higher the allowable value of the rotational speed of the internal combustion engine ENG during the second braking control is set. Therefore, the occupant of the hybrid vehicle does not feel uncomfortable caused by the sound accompanying the rotation of the internal combustion engine ENG.

In addition, since the electric capacitor BAT becomes a fully charged state at the time when the vehicle goes down the target downhill road according to the setting of the threshold value SOCth, it is possible to charge the regenerative electric power most efficiently and it is possible to prevent deterioration of the NV performance due to regenerative operation of the second rotating electric machine MG2. Further, when the restriction on the use of the brake BRK is predicted due to the temperature rise of the brake BRK or the like, the regenerative operation of the second rotating electric machine MG2 can be efficiently performed by lowering the threshold value SOCth and advancing the timing to shift to the braking control including the electricity waste.

The invention is not limited to the embodiment described, but may be appropriately modified, improved. For example, although the first rotating electric machine MG1 is subjected to power driving with the internal combustion engine ENG as a load to waste electricity, it may be consumed by converting the regenerative electric power into heat by a heating element or a heat absorber. In this case, when the timing to shift to the braking control including the electricity waste is advanced, the thermal stress can be reduced.

What is claimed is:

1. A hybrid vehicle comprising:
an internal combustion engine;
a first rotating electric machine configured to generate electricity by a power of the internal combustion engine;
an electric capacitor configured to be charged and discharged; and
a second rotating electric machine which is connected to a drive wheel, the second rotating electric machine configured to be driven by power supply from at least one of the electric capacitor and the first rotating electric machine;
a geographical information acquisition unit configured to acquire geographical information including a road on which the hybrid vehicle is scheduled to travel; and
a control unit configured to control a charging operation for charging the electric capacitor with power generated during a regenerative operation of the second rotating electric machine or an electricity waste operation for consuming the power by the hybrid vehicle, wherein:
the electricity waste operation is performed by supplying the electric power generated during the regenerative operation of the second rotating electric machine to the first rotating electric machine and setting the internal combustion engine as a load of the first rotating electric machine operating so that the internal combustion engine is continuously driven by the first rotating electric machine during a whole duration of the electricity waste operation and electricity waste is achieved;
the control unit sets a threshold value based on the geographical information acquired by the geographical information acquisition unit when the control unit predicts that a state of the electric capacitor becomes a fully charged state during the regenerative operation of the second rotating electric machine in a case that all regenerative power generated until the hybrid vehicle goes down a target downhill road, which is one of downhill roads on which the hybrid vehicle is scheduled to travel, is charged to the electric capacitor;
the control unit starts the electricity waste operation prior to the state of the electric capacitor becoming the fully charged state, and when a remaining capacity of the electric capacitor becomes equal to or greater than the threshold value during the regenerative operation of the second rotating electric machine, the control unit shifts from a braking control during the regenerative operation that does not include the electricity waste operation, to a braking control during the regenerative operation that includes the electricity waste operation such that the electricity waste operation is continuously performed during a whole duration of the braking control during the regenerative operation that includes the electricity waste operation; and
the geographical information acquisition unit and the control unit are each implemented via at least one processor.

2. The hybrid vehicle according to claim 1, wherein
the control unit lowers the threshold value when the control unit predicts that a state of the electric capacitor becomes a fully charged state during the regenerative operation of the second rotating electric machine in a case that all electric power generated during the regenerative operation of the second rotating electric machine is charged to the electric capacitor, based on the geographical information.

3. The hybrid vehicle according to claim 1, wherein:
the control unit predicts whether or not a state of the electric capacitor becomes a fully charged state during the regenerative operation of the second rotating electric machine based on: a predicted change amount of potential energy of the hybrid vehicle based on the geographical information; and the remaining capacity of the electric capacitor; and
the control unit sets the threshold to be lower, as the predicted change amount of the potential energy of the hybrid vehicle based on the geographical information is larger, when the control unit predicts that the state of the electric capacitor becomes the fully charged state, and the control unit lowers the threshold value.

4. The hybrid vehicle according to claim 1, wherein the control unit sets the threshold value to be lower, as a traveling speed of the hybrid vehicle during the regenerative operation of the second rotating electric machine is higher.

5. The hybrid vehicle according to claim 1, wherein:
the control unit predicts whether or not a state of the electric capacitor becomes a fully charged state during the regenerative operation of the second rotating electric machine based on: a predicted change amount of potential energy of the hybrid vehicle based on the geographical information; and the remaining capacity of the electric capacitor; and
the control unit sets the threshold to be lower, as the regenerative electric power amount of the second rotating electric machine generated per unit time is larger, when the control unit predicts that the state of the electric capacitor becomes the fully charged state, and the control unit lowers the threshold value.

6. The hybrid vehicle according to claim 1, wherein:
the control unit predicts whether or not a state of the electric capacitor becomes a fully charged state during the regenerative operation of the second rotating electric machine based on: a radius of curvature of the road on which the hybrid vehicle is scheduled to travel based on the geographic information; and the remaining capacity of the electric capacitor; and
the control unit sets the threshold value to be lower as the radius of curvature of the road on which the hybrid vehicle is scheduled to travel is smaller when the control unit predicts that the state of the electric capacitor becomes the fully charged state, and the control unit lowers the threshold value.

7. The hybrid vehicle according to claim 1, wherein:
the control unit sets an allowable value of a rotational speed of the internal combustion engine during the electricity waste operation to be higher as the travelling speed of the hybrid vehicle is higher.

8. The hybrid vehicle according to claim 1, wherein when the hybrid vehicle travels on a downhill road, the control unit predicts the regenerative electric power amount which is acquired by the regenerative operation of the second rotating electric machine until the hybrid vehicle goes down the downhill road based on the geographical information, and the control unit changes a start timing of the electricity waste operation according to the setting of the threshold value so that a state of the electric capacitor becomes a fully charged state when the hybrid vehicle goes down the downhill road.

9. The hybrid vehicle according to claim 1, further comprising
a mechanical brake configured to brake the hybrid vehicle, wherein
the control unit lowers the threshold value when the restriction on the use of the mechanical brake is predicted during the regenerative operation of the second rotating electric machine.

10. The hybrid vehicle according to claim 1, wherein
a lower limit is set to the threshold value set by the control unit.

11. The hybrid vehicle according to claim 1, wherein
the internal combustion engine is continuously driven in reverse by the first rotating electric machine during the whole duration of the electricity waste operation.

* * * * *